March 3, 1964  H. R. SWIFT ETAL  3,123,458
PROCESS AND APPARATUS FOR COLLECTING DUST IN
A HEATED ENVIRONMENT
Filed May 29, 1959

INVENTORS
Howard R. Swift and
BY Thomas B. O'Connell

Nobbe & Swope
ATTORNEYS

3,123,458
PROCESS AND APPARATUS FOR COLLECTING DUST IN A HEATED ENVIRONMENT

Howard R. Swift and Thomas B. O'Connell, Toledo, Ohio, assignors to Libbey-Owens-Ford Glass Company, Toledo, Ohio, a corporation of Ohio
Filed May 29, 1959, Ser. No. 816,722
12 Claims. (Cl. 65—27)

This invention relates broadly to a process for the reduction of air-borne dust in specialized industrial operations.

More particularly, this invention relates to a process for the reduction of air-borne dust in heated industrial operations.

Still more particularly, this invention relates to a process for the reduction of air-borne dust produced from refractory materials which are employed in high temperature industrial operations such as glass making and the like.

In many industrial processes carried out at high temperatures, dust is a severe problem. This is particularly true in operations such as window glass forming; the bending of glass sheets; and in the manufacture of all-glass multiple sheet glazing units. Because the dusts encountered in these processes are of a refractory nature and are consequently highly abrasive, their elimination presents an urgent need for solution.

Accordingly, it is an important object of the present invention to provide a process for the reduction of air-borne dust in specialized industrial operations.

A further object is the provision of a process for reducing air-borne dust in heated industrial operations.

A still further object is the provision of a process for the reduction of air-borne dust produced from refractory materials in high temperature industrial operations such as glass making and the like.

The objects of the present invention broadly are accomplished by applying a glass frit of the proper softening range to a surface which may or may not be a particular part of original processing equipment. The surface is however in close proximity to the original processing equipment. The softened glass coating acts as an adhesive to which dust particles in the air will cling and thereby be eliminated from the process.

This adhesive surface may be formed by coating furnace or machine parts with a glass of the proper softening range; or, special collector plates, to which the glass coating is applied, may be positioned in proper proximity to the source of dust for collection purposes.

Figure 2:
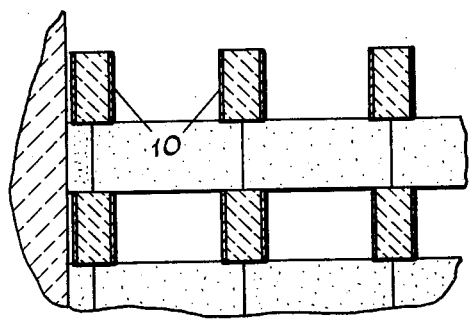
FIG. 2 is a fragmentary sectional view through a checker chamber in the flue system of a conventional glass melting furnace.

The present invention has particular application to the carryover of batch materials up through the flue system of glass melting furnaces. Accordingly, it is contemplated to coat certain of the checker bricks with an appropriate glass as shown at 10 in FIG. 2.

Figure 1:
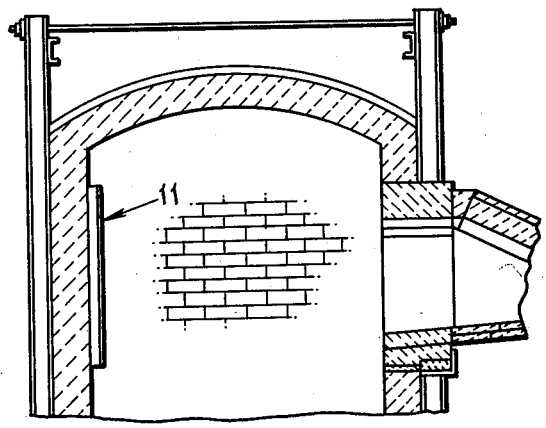
FIG. 1 is a vertical sectional view through a part of the flue system of a glass melting furnace.

Also, as an alternate embodiment, it is contemplated to place collector plates in the flue system of the furnace as shown at 11 in FIGURE 1. These would be removed periodically, cleaned and recoated to maintain their effectiveness.

Glasses adapted for use according to the present process must be slightly fluid at operating temperatures and must resist devitrification since many of the applications will be in the low end of the red heat temperature range.

Many borate glasses would be suitable for these purposes; even pure $B_2O_3$ glass would be satisfactory in certain temperature ranges. For low temperature applications, where extreme fusibility would be required, lead borate or lead borosilicate glasses could be used.

It is believed that practically any glass will work in the present process although there may be a temperature range of the order of 100° F. wherein a given glass is most effective. The main requirement is to have a soft tacky glass at the desired temperature range and still avoid flowing of the glass, particularly for vertically disposed dust collecting films.

Figure 3:
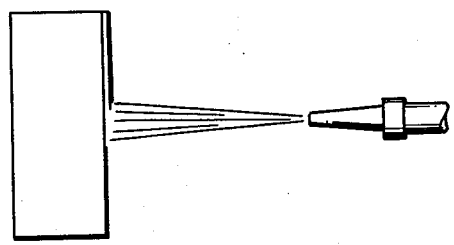
FIG. 3 is a diagrammatic view of one way in which the vitreous composition of the invention can be applied to a base.

The adhesive glass is applied to the dust collecting surface by a conventional enameling technique. Thus, a finely powdered glass is applied to the surface to be coated by spraying or dusting as shown in FIG. 3; the surface is then heated to the desired collecting temperature to form a thin film of tacky glass.

The following examples are given to illustrate the present invention; however, they are not to be considered to provide a limitation thereon and reasonable equivalents are to be included within the scope of the disclosure.

Example I

A run was made wherein panels of stainless steel were coated with boric oxide glass. These panels were placed in a furnace employed to make all-glass multiple sheet glazing units. The panels were left in the furnace for a period of time and were then removed and examined. It was found that the panels had collected a considerable amount of dust during this period.

Examples of glasses for use in particular temperature ranges in accordance with the present invention are as follows:

Example II

Silver phosphate glasses of the compositions shown below may be employed in a temperature range from 400° to 600° F.

| | Percent |
|---|---|
| $P_2O_5$ | 50–60 |
| PbO | 0–10 |
| $Ag_2O$ | 20–50 |

Example III

Silver phosphate glasses of the compositions shown below may be employed in a temperature range from 600° to 900° F.

| | Percent |
|---|---|
| $P_2O_5$ | 25–50 |
| PbO | 10–35 |
| $Ag_2O$ | 10–30 |

Example IV

Vitreous $B_2O_3$ could be used at temperatures in the range from 900° to 1200° F.

Example V

Vitreous $B_2O_3$ with increasing amounts of lead silicate, as shown below, could be used to produce glasses for use at temperatures in the range from 1200° to 1500° F.

| | Percent |
|---|---|
| $B_2O_3$ | 95–50 |
| $SiO_2$ | 0–8 |
| PbO | 5–42 |

Example VI

Vitreous $B_2O_3$ with increasing amounts of lead silicate, as shown below, could be used to produce glasses for use at temperatures in the range from 1500° to 1800° F.

| | Percent |
|---|---|
| $B_2O_3$ | 50–5 |
| $SiO_2$ | 8–15 |
| PbO | 42–80 |

*Example VII*

Soda-lime-silica glasses with increasing softening temperatures could be employed in the 1800° to 3000° F. temperature range. In the upper limits of this temperature range it would be necessary to use a panel of greater heat resistance than stainless steel; platinum or a ceramic base could be employed. The following glass composition is applicable:

| | Percent |
|---|---|
| $SiO_2$ | 72–90 |
| $Na_2O$ | 0–13 |
| CaO | 0–20 |

It will be understood that this invention this susceptible to modification in order to adapt it to different usages and conditions and accordingly, it is desired to comprehend such modifications within the scope of the appended claims.

We claim:

1. The method of reducing the amount of air-borne dust in an environment of an apparatus for processing material at high operating temperatures comprising maintaining within said environment an exposed coating of vitreous material heat softened to an adhesive state and which remains in said adhesive state at the said operating temperatures in said environment on a base of material which is stable at said operating temperatures.

2. The method of reducing the amount of air-borne dust in an environment of an apparatus for processing material heated to a temperature in the range from 400° to 600° F., comprising maintaining within said environment on a base which is stable at said range of temperature an exposed coating having the following composition:

| | Percent |
|---|---|
| $P_2O_5$ | 50–60 |
| PbO | 0–10 |
| $Ag_2O$ | 20–50 |

3. The method of reducing the amount of air-borne dust in an environment of an apparatus for processing material heated to a temperature in the range from 600° to 900° F., comprising maintaining within said environment on a base which is stable at said range of temperature an exposed coating having the following composition:

| | Percent |
|---|---|
| $P_2O_5$ | 25–50 |
| PbO | 10–35 |
| $Ag_2O$ | 10–30 |

4. The method of reducing the amount of air-borne dust in an environment of an apparatus for processing material heated to a temperature in the range from 900° to 1200° F., comprising maintaining within said environment on a base which is stable at said range of temperature an exposed coating of vitreous $B_2O_3$.

5. The method of reducing the amount of air-borne dust in an environment of an apparatus for processing material heated to a temperature in the range of 1200° to 1500° F., comprising maintaining within said environment on a base which is stable at said range of temperature an exposed coating having the following composition:

| | Percent |
|---|---|
| $B_2O_3$ | 95–50 |
| $SiO_2$ | 0–8 |
| PbO | 5–42 |

6. The method of reducing the amount of air-borne dust in an environment of an apparatus for processing material heated to a temperature in the range of 1500° to 1800° F., comprising maintaining within said environment on a base which is stable at said range of temperature an exposed coating having the following composition:

| | Percent |
|---|---|
| $B_2O_3$ | 50–5 |
| $SiO_2$ | 8–15 |
| PbO | 42–80 |

7. The method of reducing the amount of air-borne dust in an environment of an apparatus for processing material heated to a temperature in the range of 1800° to 3000° F., comprising maintaining within said environment on a base which is stable at said range of temperature an exposed coating having the following composition:

| | Percent |
|---|---|
| $SiO_2$ | 72–90 |
| $Na_2O$ | 0–13 |
| CaO | 0–20 |

8. The method of reducing the amount of air-borne dust in the flue structure of a glass melting furnace wherein the flue structure contains checker bricks including the steps of, applying to said checker bricks a coating of siliceous material that is heat softened to an adhesive state by the normal operating temperatures of said bricks, and maintaining said coating exposed to the atmosphere in said flue structure.

9. The method of reducing the amount of air-borne dust in the flue structure of a glass melting furnace, comprising maintaining within said flue structure an exposed coating of heat softened siliceous material that is adhesive at the normal operating temperatures in said flue structure on a body in said structure which is stable at said operating temperatures.

10. In an apparatus for melting glass which includes a glass melting furnace and a flue structure in open communication therewith, means for reducing the amount of air-borne dust within the furnace comprising checker bricks in said flue structure coated with exposed glass which is maintained in an adhesive state at the operating temperature of said flue structure.

11. In an apparatus for producing glass including a glass melting furnace and a flue structure in open communication therewith, means for reducing the amount of air-borne dust within said furnace comprising a heat resistant dust collector plate positioned in said flue structure, and an exposed coating of glass on said plate which is maintained in an adhesive state at the operating temperature of said structure.

12. In a furnace for processing glass within the furnace, a base stable at the temperature of said furnace and forming a part thereof, and an exposed coating of glass which is maintained in an adhesive state at the temperature of said base, said base being disposed in spaced relation to the surface of the glass being processed.

References Cited in the file of this patent

UNITED STATES PATENTS

| 47,873 | Spencer | May 23, 1865 |
| 1,313,281 | Fasting | Aug. 19, 1919 |
| 1,620,266 | McCarthy | Mar. 8, 1927 |
| 1,743,675 | Jordahl | Jan. 14, 1930 |
| 1,829,344 | Durren | Oct. 27, 1931 |
| 2,079,555 | Howard | May 4, 1937 |
| 2,197,004 | Myers | Apr. 16, 1940 |
| 2,212,162 | Littleton | Aug. 20, 1940 |
| 2,212,358 | Weekley | Aug. 20, 1940 |
| 2,228,359 | McCauley | Jan. 14, 1941 |
| 2,257,229 | Drake | Sept. 30, 1941 |
| 2,353,936 | Smith | July 18, 1944 |

(Other references on following page)

UNITED STATES PATENTS

| | | |
|---|---|---|
| 2,391,468 | Long | Dec. 25, 1945 |
| 2,424,051 | Roach | July 15, 1947 |
| 2,478,097 | Glanzer | Aug. 2, 1949 |
| 2,530,217 | Bain | Nov. 14, 1950 |
| 2,541,838 | Shardlow | Feb. 13, 1951 |
| 2,564,497 | Navias | Aug. 14, 1951 |
| 2,569,575 | Philipps | Oct. 2, 1951 |
| 2,588,106 | Frangquist | Mar. 4, 1952 |
| 2,663,382 | Dautrebande | Dec. 22, 1953 |
| 2,666,975 | Govan | Jan. 26, 1954 |
| 2,789,093 | Foehr | Apr. 16, 1957 |
| 2,793,711 | King et al. | May 28, 1957 |
| 2,819,051 | Harris | Jan. 7, 1958 |
| 2,839,286 | Poth | June 17, 1958 |
| 2,843,500 | Harman | July 15, 1958 |
| 2,847,979 | Sifrin et al. | Aug. 19, 1958 |
| 2,860,449 | Paxton | Nov. 18, 1958 |